INVENTORS.
EMIL TORICK &
ARTHUR KAISER
BY
Brumbaugh, Free, Graves & Donohue
their ATTORNEYS United States Patent Office
3,398,381
Patented Aug. 20, 1968

3,398,381
CONTROL CIRCUIT FOR RESTRICTING INSTANTANEOUS PEAK LEVELS OF AUDIO SIGNALS
Emil Torick, Norwalk, and Arthur Kaiser, Trumbull, Conn., assignors to Columbia Broadcasting System, Inc., New York, N.Y., a corporation of New York
Filed Mar. 22, 1965, Ser. No. 441,464
13 Claims. (Cl. 332—19)

ABSTRACT OF THE DISCLOSURE

Automatic circuit means for restricting instantaneous peak levels of audio signals to a predetermined value is described. A Zener diode clipper, which responds instantaneously to short peaks to limit their maximum amplitudes to a predetermined level, such as that necessary for 100% modulation, is preceded by a limiting circuit of the automatic gain control type which has a response time long relative to the clipper but still short with respect to conventional AGC circuits. The slower circuit responds to signal excursions of a predetermined duration, e.g., 2 to 3 milliseconds, which if clipped would introduce audible distortion. The recovery time of the slower limiting circuit is made approximately equal to the syllabic rate of speech to avoid audibly detectable distortion.

Figures 1, 2:
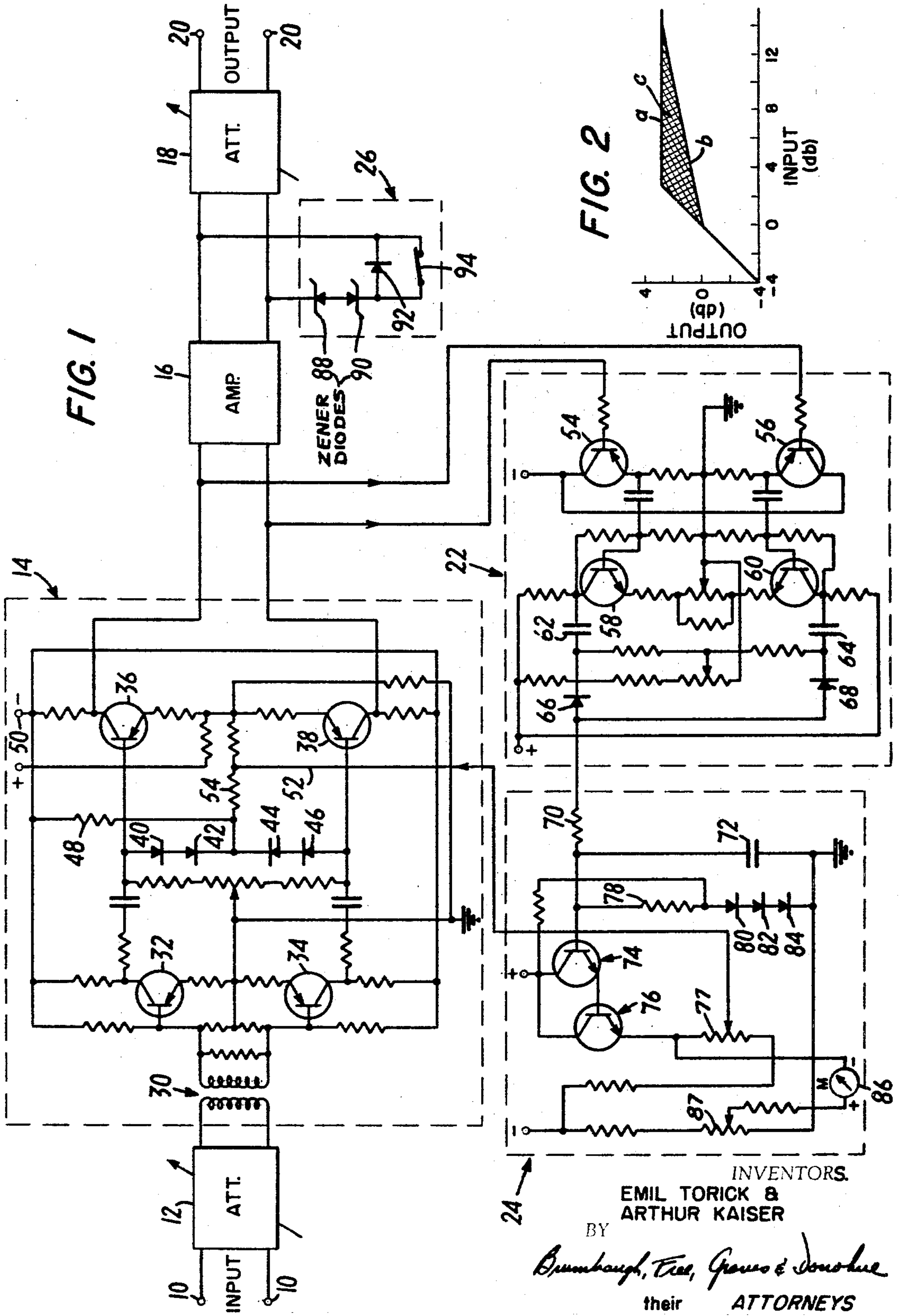

The present invention relates to signal level control means, and more particularly to apparatus for automatically controlling the instantaneous peak amplitudes of program signals so as to enable more efficient modulation and the attainment of maximum program power in broadcasting equipment, and to provide improved disc or magnetic recording.

As is well understood in the broadcasting industry, most efficient broadcast practice requires that the percentage modulation of the carrier wave be maintained as high as possible consistent with good quality of transmission and good broadcast practice. In the case of amplitude modulation broadcasting, one-hundred percent modulation is achieved when the instantaneous peak amplitude of the modulated carrier is equal to twice the unmodulated carrier wave amplitude. In frequency modulation broadcasting, the amplitude of the modulating signals should be such as to produce a frequency deviation of the carrier of 75 kc., which is the one-hundred percent modulation figure established by the Federal Communications Commission.

Control of the broadcast signal level prior to modulation to bring it to the one-hundred percent modulation amplitude may be effected by manually operated means or by suitably preadjusting amplifier gain. However, in normal programming, there often occur short duration signal peaks which substantially exceed the one-hundred percent modulation amplitude and which cannot be accommodated by ordinary level controls. With amplitude modulation, these peaks result in overmodulation, with its attendant distortion, while in the frequency modulation case, they increase the frequency deviation beyond the prescribed limits.

To prevent overmodulation, peak limiters are often used. Conventional peak limiters, however, present the broadcaster with a choice between two evils. Either the average program level must be reduced to a point where the limiting of the program peaks will not be drastic enough to cause distortion of the program signal, thereby reducing the average percent modulation, or the audible distortion must be tolerated in the interest of maintaining the average modulation level at or near the maximum value. A compromise in conventional practice may be effected by providing a long recovery time in the conventional limiter. This minimizes an audible distortion effect known as "pumping," but at the expense of a loss in modulation capability as the limiter recovers from its reduced gain condition.

As is well known, different program waves may have the same average peak level, as indicated on a standard VU (volume unit) meter, but may have significant differences in peak factor. Thus, one broadcast signal may include high amplitude program peaks (high peak factor) as compared to another signal having relatively low amplitude peaks (low peak factor) but of significantly greater average power. When fed into a conventional limiter, the high peak factor signal is normally passed at a lower gain than a signal with the lower peak factor. Because of the relatively long recovery time required to minimize the pumping distortion described above, the average modulation by the high peak factor program will be unnecessarily low during the intervals between peaks of high amplitude. It will be seen, therefore, that as the program signal varies from high factor to low peak factor during a broadcast, the modulation efficiency will similarly vary, thereby preventing optimum utilization of the transmitter capability.

An analogous problem exists in the recording art. In the case of grooved records, the spacing between adjacent grooves imposes strict limitations on the swing of the cutting stylus and peak control of the signal to be recorded must be effected. Similarly, saturation effects in magnetic recording require sure control of signal peak amplitudes.

It is the primary object of the present invention to provide a program peak signal control apparatus which enables the maintenance of a high average modulation level and rapid control of signal peaks, while at the same time avoiding the shortcomings of the prior art arrangements.

Another object of the present invention is to provide automatic peak signal control means combining a relatively fast limiting action with substantially instantaneous clipping whereby program modulation levels are maintained at high levels and distortion normally resulting from peak limiting is minimized.

A further object of the present invention is to provide a compact, reliable circuit arrangement for broadcasting equipment which enables rapid response to program signal peak level changes whereby maximum signal modulation capability with a minimum of audible distortion is achieved.

In broadcasting, it is conventional practice to provide an average signal level control to overcome relatively slow changes in signal level. This can be done, for example by manual "gain riding" or automatically by circuit arrangements such as described in co-pending application Ser. No. 173,281, filed February 14, 1962, for "Gain Control Apparatus Providing Constant Gain Interval" in the names of Benjamin B. Bauer and Arthur Kaiser and assigned to the present assignee, now Patent No. 3,187,268, granted June 1, 1965. The output of such a device is an audio signal of uniform average peak level.

These signals however, although of uniform average peak levels, ordinarily exhibit variations in peak factor in excess of 10 db. The peaks contributing to the peak factor variations may vary in duration from a few milliseconds to one or two hundred microseconds. To prevent overmodulation and at the same time minimize audible distortion, control of the signal peaks should be accomplished by a technique which adjusts to the varying durations of the peaks to provide as nearly as possible the optimum type of amplitude control for each peak duration.

With peaks of one millisecond or greater, a gain reduction is necessary so that they are transmitted without distortion. On the other hand, peaks of much shorter duration may be instantaneously clipped without introducing distortion perceptible to the ear.

The present invention provides peak level control by a combination of these techniques. Gain reduction for the relatively long duration peaks is effected by an automatic gain control arrangement preferably of the feedback type having both attack and recovery times short relative to conventional limiters. The circuit thus can respond to signal peaks having durations intermediate those accommodated by the average level control means and about one millisecond, to keep distortion at a minimum. Signal peaks shorter than those effective to cause gain reduction are subjected to substantially instantaneous clipping at the proper level to avoid overmodulation.

Since in most broadcast and recording applications, some form of average level control is employed, it will rarely be necessary that the gain control circuitry will have to provide more than a 6 db change. If the discharge time constant of the gain control rectifier circuit is made approximately equal to the syllabic rate of speech, i.e., about 100 milliseconds, gain recovery of the order of 6 db will not be perceptible to the listener as the well known phenomenon of "pumping." Over this time interval, the ear is not able to resolve such variations in level. Moreover, the peaks subjected to instantaneous clipping will be of such short duration as to produce substantially no audible effects.

The foregoing and other objects, features and advantages of the present invention will become more readily apparent from the following detailed description thereof when taken in conjunction with the accompanying drawings in which:

FIGURE 1 is a combination block and schematic diagram of the signal level control apparatus of the present invention; and FIGURE 2 is a graph illustrating the response characteristic of the circuit of FIGURE 1.

Referring now to FIGURE 1, audio frequency program signals from a microphone or transcription device, for example, are supplied to the input terminals 10 and thence through an attenuator network 12 to the input of a controllable gain amplifier circuit arrangement indicated generally at 14. As will be explained hereinafter, the amplifier circuit 14 is part of the slow response portion of the control circuit. The output of the amplifier 14 is then applied through a further amplifier stage 16 to an output attenuator 18, whose output terminals 20 couple the level controlled signal to the modulating circuitry of the broadcast transmitter, or recording apparatus.

The circuit arrangements enclosed within the dotted lines and indicated generally as 14, 22 and 24 constitute the gain control portion of the invention. As mentioned above, the circuit 14 includes an amplifier stage whose gain may be varied in accordance with the value of a control signal. The circuit arrangement 22 is basically a rectifier or detector which receives the output signal from the amplifier arrangement 14 and provides a D.C. control signal representative of the changes in signal level resulting from the relatively long duration peaks. The D.C. signal is fed back to control the gain of the amplifier 14 via the coupling and indicating circuit 24. The signal applied to the amplifier stage 16 is thereby maintained at a substantially constant predetermined power level.

The just described gain control arrangement is designed in one practical embodiment to have an attack time to respond to peaks of about one millisecond in duration. Accordingly, signal peaks of less than one millisecond duration do not appreciably affect its operation and are passed through the amplifiers 14 and 16. Prior to application to the modulating circuitry however, these peaks are clipped by the diode clipping circuit indicated generally at 26. This circuit has a substantially instantaneous response and serves to complete the level controlling operation such that no overmodulation occurs while the average modulation percentage is maintained at or near the one-hundred per cent level. The amplifier 16 isolates clipping circuit 26 from the automatic gain control circuitry so that the clipping action of the former does not affect the response of the latter.

The level controlled signal, after peak clipping by circuit 26 is passed through a variable attenuator 18 and applied to the terminals for transmission to the modulating circuit of the transmitter, or the recording apparatus. The attenuator 12 is adjusted to set the average level of the signal applied to the amplifier circuit 14 such that the signal peaks will be of an amplitude in the operating range of the gain control and clipping circuits. The output attenuator 20 sets the signal level at the output terminals 20 to achieve the desired one-hundred per cent modulation.

Turning now to the details of the circuit of FIGURE 1, the signal at the output of the attenuator 12 is fed through transformer 30 and coupled to the bases of transistors 32 and 34 which, in conjunction with the circuit elements shown, constitute a push-pull class A amplifier of conventional design. The output of the amplifier is taken from the respective collectors of the transistors 32 and 34 and applied through coupling resistors and capacitors to the bases of transistors 36 and 38, which are the active elements of a second push-pull class A amplifier.

Coupled across the bases of the transistors 36 and 38 are diode pairs 40, 42 and 44, 46, which together provide a variable attenuation path for the output of the transistors 32, 34. As shown, the respective pairs of diodes are arranged with opposing polarities and their common junction coupled via resistor 48 to a negative D.C. potential 50, which also serves as the collector supply voltage for the transistors.

Also applied to the common point of the aforementioned diode pairs is the control voltage developed by the detector 22. This voltage, which will be in the form of a varying D.C. level, is coupled to the common point via conductor 52 and the resistor 54 and is superimposed upon the negative D.C. level applied via resistor 48. The change in voltage level produced thereby varies the current flow through the respective diode pairs and thus changes the attenuation provided across the output terminals of the input class A amplifier stage. As a result, the signal level provided at the bases of the transistors 36 and 38 is changed accordingly. It will be seen, therefore, that the diodes 40, 42, 44 and 46 provide a variable attenuation network which serves to control the input level to the final class A amplifier stage and thus the output level of the amplifier circuit 14. The use of the opposed diode pairs enables instantaneous control over a wide range of voltage levels.

The output signal from the amplifier circuit 14 is coupled through a push-pull emitter-follower stage including transistors 54, 56 to the input of an additional push-pull amplifier stage including transistors 58 and 60. The output signal taken from the collectors of transistors 58 and 60 is coupled via coupling capacitors 62, 64, respectively, to diodes 66 and 68. The latter have one terminal coupled in common to provide full wave rectification of the output of the amplifier stage comprising transistors 58 and 60.

The rectified output is applied through resistor 70 to charge a capacitor 72 to the value of the rectified voltage. The time constant presented by the resistor 70 and capacitor 72 is made relatively short, e.g., 1 millisecond, to provide the proper attack time for the gain control circuit.

The voltage across the capacitor 72 is coupled by a pair of cascaded emitter-follower stages 74, 76 to the variable attenuation network in the amplifier circuit 14. The resistor 78 and the diodes 80, 82 and 74 in parallel with the capacitor 72, determine its discharge time which is selected such that the recovery time of the gain control circuit coincides approximately with the syllabic rate of speech, e.g., 100 milliseconds. This avoids the pumping distortion discussed above. The potentiometer 77 in the emitter circuit of transistor 76 is used to set the quiescent level for the AGC signal.

The automatic gain control voltage is also coupled to a meter 86 which provides an indication of the gain control action of the circuit. Potentiometer 87 provides a full scale adjustment for the meter 86.

The gain controlled program signal appearing at the output of the amplifier circuit 14 is further amplified in amplifier stage 16. The output of this stage is shunted by the peak clipping circuit 26 which is seen to comprise a pair of back-to-back Zener diodes 88, 90 in series with a conventional diode 92. A manually controllable switch 94 is shunted across the diode 92 for reasons which will hereinafter be explained.

The clipping level of the circuit 26 is determined by the reverse breakdown voltage of the Zener diodes 88, 90. As is well known, these devices have conventional diode characteristics in their forward direction, and become highly conductive in their reverse direction under a predetermined reverse bias voltage. By selecting Zener diodes of the proper reverse breackdown characteristics, the clipping level may be accurately controlled.

With the conventional diode 92 shorted out by switch 94 as shown, the clipping action of the circuit 26 is symmetrical, i.e., both negative and positive going signal peaks will be clipped at the values determined by the reverse bias characteristics of the Zener diodes 88 and 90, respectively. This provides an output signal consistent with good engineering practices and government regulations for AM, FM, TV broadcasting and recording applications. With respect to AM, the restriction imposed by law extends only to the negative portion of the signal and, depending upon the transmitter capability, increased power may be transmitted by allowing positive going signal peaks to modulate the carrier without clipping. This can be effected with the illustrated circuit by opening switch 94, whereby the diode 92 becomes non-conductive in the presence of positive going signals. The clipping circuit 26 is thus effectively open-circuited for one polarity of the signal.

In FIGURE 2 is shown the composite gain characteristic of the peak level control circuit of the invention for a given time. The flat curve indicated as *a* in the figure represents the response of the peak clipping circuit 26 and as described above, provides a substantially constant output level for all levels above a predetermined input level.

The lower curb *b* represents the slower gain control action achieved by elements 14, 22 and 24. For relatively slow changes in input level, the gain of the amplifier including transistors 36 and 38 decreases as the input signal level increases. It will be understood, of course, that the response times of the two circuits differ somewhat, the circuit 26 having the characteristic *a* providing a substantialy instantaneous response (e.g., 1 microsecond) while gain control circuit providing characteristic *b* operates at a slower speed (e.g., 1 millisecond). Accordingly, it will be recognized that a true representation of the composite characteristic will require three dimensions, with time as the third variable. However, for explanatory purposes, the two dimensional curves of FIGURE 2 are believed satisfactory.

It will be seen that for an input signal level below about 0 db, no gain control or clipping action takes place. Above this input value, gain control and/or clipping will occur, depending upon the amplitude and time duration of the signal peaks. The area *c* thus defines the area of operation of the circuit of FIGURE 1.

In adjusting the control circuit of the invention for use in a broadcast transmission, the attenuators 12 and 18 are respectively set such that the circuit operates in the area *c* of its characteristic and the output signal level is sufficient to achieve the 100% modulation level required. For this purpose, a calibrating signal such as a 1 kilocycle per second sine wave may be used.

Although the circuit described may be used without it, it is particularly adaptable for use in conjunction with the automatic level control arrangements such as described in the aforemention Patent No. 3,187,268.

It will be apparent that many modifications and changes falling within the spirit of the present invention will occur to those skilled in the art and it is intended to be limited only by the scope of the appended claims.

We claim:

1. Apparatus for restricting the instantaneous peak amplitudes of audio frequency signals to a given maximum level comprising, first circuit means for maintaining substantially at said given level the amplitudes of signal peaks of greater than a predetermined duration, said first circuit means being responsive substantially only to signal peaks of greater than said predetermined duration, and second circuit means coupled to receive the output of said first circuit means for clipping substantially at said given level signal peaks of durations less than said predetermined duration which have been passed by said first circuit means.

2. Apparatus according to claim 1 wherein said second circuit means is selectively operable between a first condition in which both negative and positive going peaks are clipped at said given level and a second condition in which only negative going peaks are clipped at said given level.

3. Apparatus according to claim 1 wherein said first circuit means comprises a variable gain amplifier for receiving said audio frequency signals, a detecting circuit coupled to said amplifier and responsive substantially only to said signal peaks of greater than said predetermined duration to develop a control signal, and means for applying said control signals to said amplifier to vary the gain thereof in a manner to reduce amplitude changes at its output.

4. Level control apparatus according to claim 3 wherein said variable gain amplifier includes a push-pull amplification stage and a controllable attenuation network connected in shunt with the input of said stage for varying the gain thereof.

5. Apparatus for controlling the level of program signals to obtain a desired average percent modulation comprising, a variable gain amplifier for receiving said program signals including a push-pull amplification stage having a pair of transistors with their emitters coupled together, said amplifier further including a controllable attenuation network connected in shunt with the input of said stage for varying the gain thereof and comprising a pair of unidirectioally conducting paths each including a plurality of similarly polarized diodes connected between the base of one of said transistors and a common potential level, a detecting circuit having a relatively long response time coupled to said amplifier and responsive to relatively long duration program signal peaks to develop control signals, means for applying said control signals to said attenuation network to vary the gain of said amplifier in a manner to reduce amplitude changes at its output, and a signal clipping circuit coupled to receive the output of said amplifier and having a substantially instantaneous response for clipping short duration signal peaks at a prescribed level.

6. Apparatus according to claim 3 further comprising indicating means coupled to said detecting circuit for providing indications of the magnitudes of said control signals.

7. Apparatus for restricting the instantaneous peak amplitude of program signals to a given level to obtain a desired average percent modulation comprising, first circuit means for maintaining the level of program signal peaks of greater than a predetermined duration at a value to achieve the desired percent modulation, said first circuit means being responsive substantially only to program signal peaks of greater than said predetermined duration, and second circuit means including a pair of oppositely polarized threshold clipping means having a substantially instantaneous response coupled to the output of said first circuit means.

8. Apparatus according to claim 7 wherein each of said threshold clipping means comprises a Zener diode having a predetermined reverse breakdown voltage.

9. Apparatus according to claim 7 wherein said second circuit means comprises a pair of oppositely polarized Zener diodes connected in series with a unidirectionally conducting device, and selectively operable short circuiting means connected in shunt with said unidirectionally conducting device.

10. Apparatus for controlling the level of program signals to obtain a desired average percent modulation comprising, a variable gain amplifier for receiving said program signals, a detecting circuit coupled to said amplifier and responsive to relatively long duration program signal peaks to develop control signals, means for applying said control signals to said amplifier to vary the gain thereof during said peaks in a manner to reduce amplitude changes at its output and a signal clipping circuit including a pair of oppositely polarized Zener diodes connected in series with a selectively operable unidirectionally conducting device coupled to receive the output of said amplifier and substantially instantaneously responsive thereto for limiting short duration signal peaks to a prescribed level.

11. Apparatus according to claim 10, wherein there are further provided signal level adjusting means at the input of said amplifier and at the output of said signal clipping circuit.

12. Apparatus according to claim 10, wherein the recovery time of said detecting circuit is approximately equal to the syllabic rate of speech, whereby detection of pumping distortion by the human ear is minimized.

13. Apparatus according to claim 7 further comprising amplifying means interposed between said first and second circuit means.

References Cited

UNITED STATES PATENTS

| | | | |
|---|---|---|---|
| 2,337,196 | 12/1943 | Hollingsworth | 325—482 X |
| 2,668,234 | 2/1954 | Druz. | |
| 2,937,270 | 5/1960 | Atwood | 325—402 X |
| 3,073,900 | 1/1963 | Victoreen | 330—135 X |
| 3,218,481 | 11/1965 | Lugten et al. | 307—88.5 |
| 3,230,458 | 1/1966 | Stangeland. | |
| 3,231,686 | 1/1966 | Hueber | 307—88.5 |

FOREIGN PATENTS

| | | |
|---|---|---|
| 640,920 | 8/1950 | Great Britain. |

ALFRED L. BRODY, *Primary Examiner.*